HILL & TUTTLE.
Stalk-Chopper.

No. 60,008.  Patented Nov 27, 1866.

United States Patent Office.

IMPROVEMENT IN MACHINE FOR CUTTING AND RAKING CORN-STALKS.

THOMAS M. HILL AND S. D. TUTTLE, OF EATON, OHIO.

*Letters Patent No. 60,008, dated November 27, 1866.*

SPECIFICATION.

TO ALL WHOM IT MAY CONCERN:

Be it known that we, THOMAS M. HILL and S. D. TUTTLE, of Eaton, in the county of Preble, and State of Ohio, have invented a new and useful Machine for Cutting and Raking Corn and Cotton Stalks; and we do hereby declare that the following is a full, clear, and exact description thereof, which will enable others skilled in the art to make and use the same, reference being had to the accompanying drawings, forming part of this specification, in which—

Figure 1:
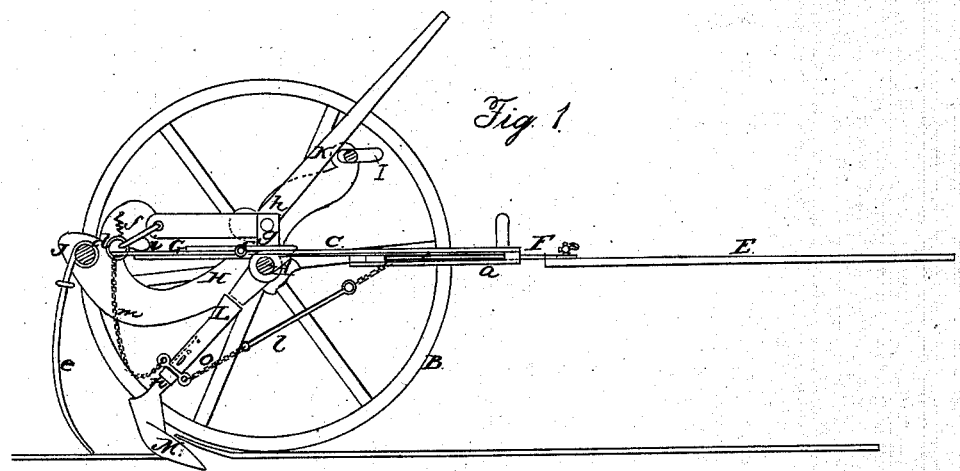
Figure 2:
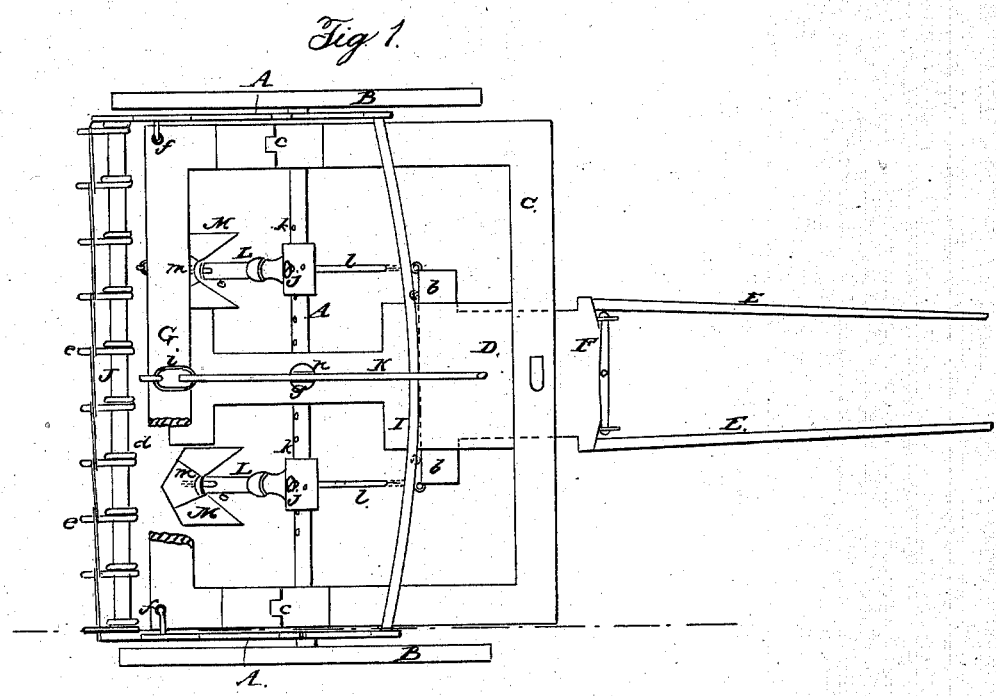

Figure 1 is a side sectional view of our invention taken in the line $x\ x$, fig. 2.

Figure 2, a plan or top view of the same.

Similar letters of reference indicate like parts.

This invention consists in a combination of ploughs, cutters, and a rake applied to a mounted frame, and arranged as hereinafter fully shown and described, whereby corn and cotton stalks may be cut, ploughed up, and raked into suitable piles convenient for removal from the field.

A represents an axle having a wheel, B, fitted loosely on each end of it, and C is a frame composed of three bars arranged to form three sides of a quadrangle, as shown in fig. 2. This frame C has a plate or bar, D, attached centrally to its front bar or cross-piece, the bar D being parallel with the side bars of the frame. E are thills, the rear ends of which are attached to a plate, F, which is fitted in guides $a$ at the under side of the plate or bar D, the rear end of plate F being provided with lateral projections, $b\ b$, which extend beyond the sides of the plate or bar D, as shown clearly in fig. 2. The plate F has a certain degree of play in the guides $a$, underneath the plate or bar D, as will be understood by referring to fig. 1. The frame C is fitted to the axle A by loops, or eyes, so that said frame may turn on the axle; and to the rear end of frame C, a frame, G, is attached by joints $c$. H H are two levers fitted loosely on the axle A, one at each side of frame C. The front ends of the levers H H are connected by a rod, I, and the rear ends have the head $d$ of a rake, J, fitted in them, the teeth, $e$, of the rake being attached to the head, $d$, in the same way as the teeth of an ordinary horse rake. The rear ends of the levers, H H, are connected by springs, $f$, to the rear part of the frame G, and these springs have a tendency to keep the rake teeth down to their work. K is a lever, the fulcrum, $g$, of which is an upright, $h$, on the plate or bar D. The rear end of this lever is connected by a link, $i$, with the rear end of the frame G. L L represent plough standards, which are fitted on the axle A, and secured thereon at any desired point by screws, $j$, which fit in any of a series of holes, $k$, in the axle, according to the distance required between the standards. The lower ends of these standards are connected by rods and chains, $l$, with the projections, $b\ b$, at the rear end of the plate F. The lower ends of the standards are also connected by chains, $m$, with the rear of frame G. M M are ploughs and cutters combined; they are made in the form of a fork, or divaricated, as shown in fig. 2, and provided with cutting edges, and if desired cutters may be attached to admit of being removed for sharpening when required. These cutters and ploughs, as the machine is drawn along, cut the top or long roots and throw the upper portion out of the ground. The draught, it will be seen, comes directly upon the plough-standards, in consequence of the connection of the latter with the thills, and the ploughs and cutters are therefore rendered very efficient in their operation; and at any time when it is desired to raise the ploughs out of the ground the draught animal is backed and the lever, K, pressed down. The rake, J, may be raised and lowered independently of the ploughs by pressing down the bar or rod, I. The stalks, consequently, may be deposited in piles at convenient spots without interfering with the work of the ploughs. The ploughs and cutters may be adjusted at a greater or less distance apart, to correspond with the width of the spaces between the rows of plants, by adjusting the standards, L L, on the axle, A. The ploughs and cutters, M M, are provided with shanks, $n$, which are fitted in the lower ends of the standards, L L, and secured therein at a greater or less height by pins, $o$. By these means the ploughs and cutters may be adjusted at a greater or less height, as required.

What we claim as new, and desire to secure by Letters Patent, is—

1. The ploughs and cutters, M M, applied to standards, L, which are secured on the axle, A, of the machine, and connected to the sliding-thills, E, by chains and rods, $l$; and connected by chains, $m$, to the frame, G, all arranged to operate substantially in the manner as and for the purpose herein set forth.

2. The rake J, attached to the levers H H and connected to the frame G, by springs $ff$, in combination with the ploughs and cutters M M, all arranged substantially as and for the purpose specified.

THOMAS M. HILL,
STERLING D. TUTTLE.

Witnesses:
B. F. LARSH,
DAVID NEAL.